(12) United States Patent
Vendrow

(10) Patent No.: US 9,203,965 B1
(45) Date of Patent: Dec. 1, 2015

(54) METHOD, DEVICE AND SYSTEM FOR PROVIDING NOTIFICATION OF MESSAGE

(71) Applicant: RingCentral, Inc., San Mateo, CA (US)

(72) Inventor: Vlad Vendrow, Redwood City, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 14/500,555

(22) Filed: Sep. 29, 2014

(51) Int. Cl.
*H04M 1/64* (2006.01)
*H04M 3/533* (2006.01)
*H04W 4/12* (2009.01)
*H04M 1/725* (2006.01)
*H04W 68/00* (2009.01)

(52) U.S. Cl.
CPC .......... *H04M 3/5335* (2013.01); *H04M 1/7255* (2013.01); *H04M 1/72552* (2013.01); *H04W 4/12* (2013.01); *H04W 68/005* (2013.01)

(58) Field of Classification Search
CPC ..... H04M 3/537; H04M 3/533; H04L 12/587
USPC .............. 379/88.12, 88.18; 709/206; 715/700
See application file for complete search history.

(56) References Cited

U.S. PATENT DOCUMENTS

| | | | |
|---|---|---|---|
| 2006/0195785 A1* | 8/2006 | Portnoy et al. | 715/700 |
| 2009/0097620 A1* | 4/2009 | Kim et al. | 379/88.17 |
| 2014/0136629 A1* | 5/2014 | Nguyen | 709/206 |

* cited by examiner

*Primary Examiner* — Fan Tsang
*Assistant Examiner* — Van D Huynh
(74) *Attorney, Agent, or Firm* — Finnegan, Henderson, Farabow, Garrett & Dunner LLP

(57) ABSTRACT

System, method, and device are disclosed for providing a notification of a new message. According to certain embodiments, a device may receive a message via at least one communication interface; determine an attribute associated with the message based on contents of the message; determine a notification feature based, at least in part, on the attribute; and generate a notification according to the notification feature.

9 Claims, 6 Drawing Sheets

METHOD, DEVICE AND SYSTEM FOR PROVIDING NOTIFICATION OF MESSAGE

TECHNICAL FIELD

The present disclosure relates to the field of communication devices and systems and, more particularly, methods, devices and systems for providing notifications of messages.

BACKGROUND

Voice mail is a useful business and personal tool that allows callers to leave voice messages when the called party is not available to take an incoming call. Voice mail has been implemented by telephone service providers, both wireline and wireless, as a common feature provided to their users. In a typical application, if a communication device associated with a user (e.g., a subscriber of the telephone service) is not available, or if the user does not respond to or accept a call received over the communication network, the call may be forwarded to a Voice Mail System (VMS). The VMS then records a voice message from the caller, stores the message in a mailbox associated with subscriber the user's identifier (e.g. phone number) for later retrieval by the user, or forwards the stored message to the communication device when it becomes available in the network. A message notification is provided to indicate that a voice message is available for the user.

SUMMARY

In one disclosed embodiment, a device is disclosed. The device comprises at least one communication interface and at least one processor in communication with the communication interface. The at least one processor is configured to receive a message via the at least one communication interface; determine, based on contents of the message, an attribute associated with the message; determine a notification feature based, at least in part, on the attribute; and generate a notification according to the notification feature.

In another disclosed embodiment, a system for providing a notification feature to a user device is disclosed. The system comprises at least one network interface and at least one processor in communication with the network interface. The at least one processor is configured to receive a message via the at least one network interface; determine, based on contents of the message, an attribute associated with the message; determine the notification feature based, at least in part, on the attribute; and send the notification feature to the user device.

In another disclosed embodiment, a computer-implemented method is disclosed. The computer-implemented method comprises: receiving a message via at least one communication interface; determining, by at least one processor, an attribute associated with the message based on contents of the message; determining a notification feature based, at least in part, on the attribute; and generating a notification according to the notification feature.

BRIEF DESCRIPTION OF THE DRAWINGS

The accompanying drawings, which are incorporated in and constitute part of this disclosure, together with the description, illustrate and serve to explain the principles of various example embodiments.

DETAILED DESCRIPTION

Figure 1:
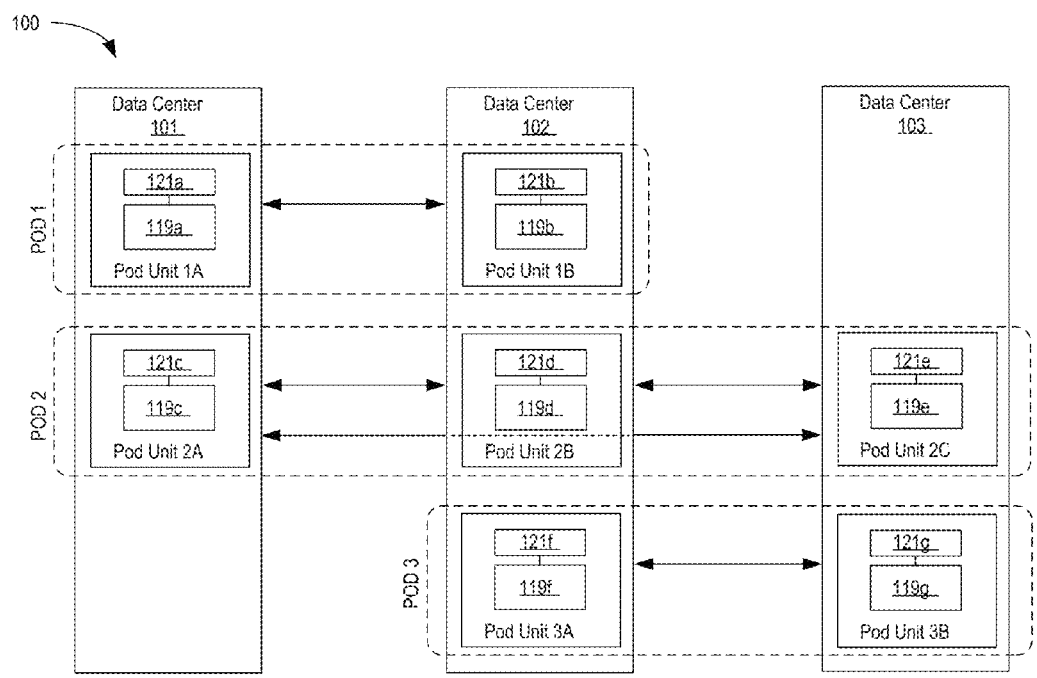
FIGS. 1 and 2 are simplified diagrams of an example of a communication system in which various implementations described herein may be practiced.

Reference will now be made in detail to the example embodiments implemented according to the present disclosure, the examples of which are illustrated in the accompanying drawings. Wherever possible, the same reference numbers will be used throughout the drawings to refer to the same or like parts.

Message notifications, such as tones or vibrations, are helpful indicators to alert a user of the presence of a message for the user's review. For example, when a new voicemail message or text message is received at the communication device, the device may generate a ring tone alerting the user that a new voicemail message or text message is received. The ring tone, however, generally does not convey information on attributes of the message other than the receipt or availability of the message. Accordingly, the user is unable to assess the importance of the new message or take action on the message such as when to review the message. Improvements in providing notifications of messages that convey information of message attributes and allow users to take an appropriate action accordingly are desirable.

Embodiments of the present disclosure provide methods, devices, and systems for providing notifications of messages that convey information about attributes of the message. The disclosed embodiments receive a message via a communication interface, determine an attribute associated with the message, determine a notification feature based on the attribute, and generate a notification according to the notification feature. In some embodiments, a user device (e.g., a device associated with a subscriber of communication services) can identify characteristics of the message, generate a notification with a corresponding notification feature, and provide the notification to the user through a user interface. In other embodiments, a server providing communication services may identify characteristics of the message associated with a user account, determine a corresponding notification feature, and send the notification feature to the corresponding user device. The user device may then generate a notification according to the received notification feature via a user interface, such as a speaker or a vibration device, alerting receipt of the new message.

The disclosed embodiments determine notification features based on attributes of the messages and provide the notifications according to the notification features. In doing so, information relating to attributes of the messages is conveyed through the notifications. Correspondingly, users are informed of the attributes of the new messages by the notifications, and thus, are able to make appropriate decisions as to what action to take in connection with the messages.

The embodiments herein include computer-implemented methods, tangible non-transitory computer-readable mediums, and systems. The computer-implemented methods can be executed, for example, by at least one processor that receives instructions from a non-transitory computer-readable storage medium. Similarly, systems and devices consistent with the present disclosure can include at least one processor and memory, and the memory can be a non-transitory computer-readable storage medium. As used herein, a non-transitory computer-readable storage medium refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," can additionally refer to multiple structures, such a plurality of memories or computer-readable storage mediums. As referred to herein, a "memory" can comprise any type of computer-readable storage medium unless otherwise specified. A computer-readable storage medium can store instructions for execution by at least one processor, including instructions for causing the processor to perform steps or stages consistent with an embodiment herein. Additionally, one or more computer-readable storage mediums can be utilized in implementing a computer-implemented method. The term "computer-readable storage medium" should be understood to include tangible items and exclude carrier waves and transient signals.

FIG. 1 shows an example of a communication system 100 in which various implementations as described herein may be practiced. System 100 can be, for example, a telephony system such as a hosted Private Branch Exchange (PBX) platform that provides voice and video over IP, fax services, etc. Communication system 100 includes data centers 101, 102, and 103. Each data center is a point of presence (POP) that includes the network computing resources (e.g., servers, routers, switches, network connections, storage devices, etc.) necessary to support the services provided by communication system 100. Each data center is typically located in a different geographical region.

In the depicted example, communication system 100 includes three user points of data (pods), i.e., pods 1, 2 and 3, each of which is a logical grouping of two or more pod units situated in different data centers. Each pod serves a different subset of user accounts. In this example, each pod unit (e.g., unit 2A) serves the same subset of users as the other pod units within the same pod (e.g., pod units 2B and 2C). Each pod unit includes a communication server 119a-119g configured to provide substantially the same services to the same subset of users as the other pod units within the same pod. Each pod unit also includes an account database 121a-121g configured to support the respective communication servers for the corresponding subset of users. It should be noted that the term "user" is being used in the interest of brevity and may refer to any of a variety of entities that may be associated with a subscriber account such as, for example, a person, an organization, an organizational role within an organization, a group within an organization, etc.

Figure 2:
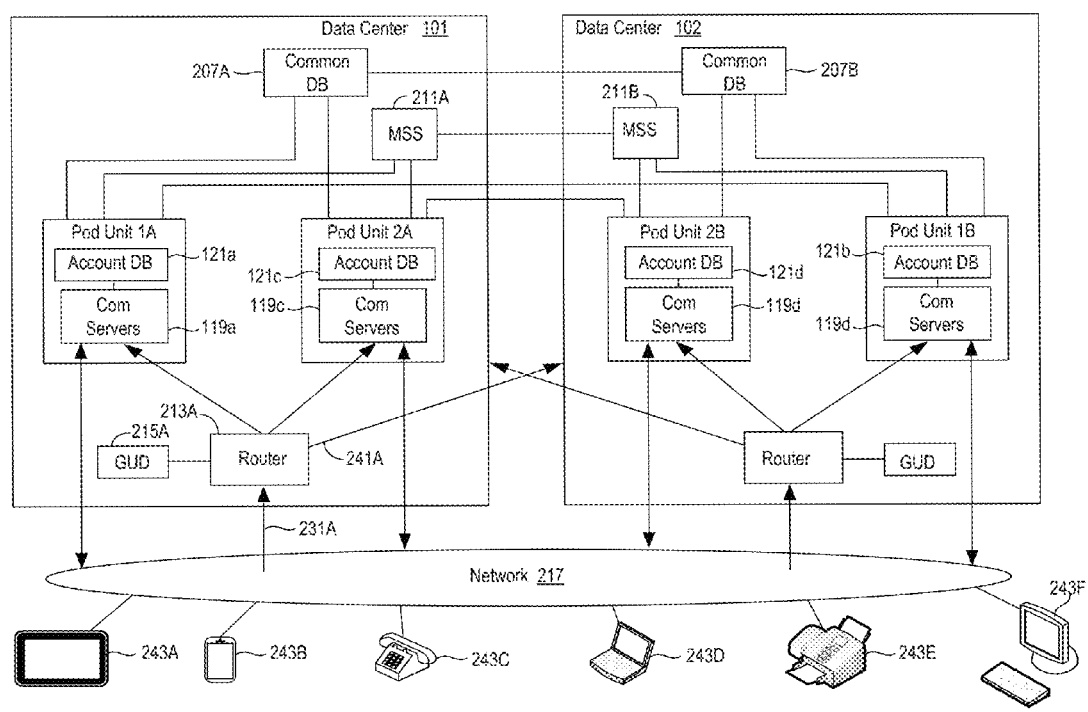

FIG. 2 shows various components of communication system 100 of FIG. 1. Specifically, FIG. 2 shows the various interconnections within and between data centers 101 and 102. Both data centers are in communication with network 217. Service requests from various communication devices 243A-243F are routed through network 217 to either or both of the data centers. Devices 243A-243F represent a diversity of client devices that connect with a services system designed in accordance with one or more implementations as described herein. Such client devices include, for example (and without limitation), cell phones, smart phones, tablets, laptop and desktop computers, conventional telephones, IP phones, teleconferencing devices, videoconferencing devices, set top boxes, gaming consoles, etc. Reference to specific client device types should therefore not be used to limit the scope of the present disclosure.

Data center 101 includes pod units 1A and 2A, a common database (CDB) 207A, a message storage system (MSS) 211A, a router 213A, and a global user directory (GUD) 215A. Additional pod units (not shown) may also be included in data center 101. Data center 102 is similarly configured and includes components that operate substantially the same as those in data center 101. Data centers 101 and 102 provide backup and redundancy to one another in the event of failure.

Communication servers 119 provide telecommunication services (e.g., voice, video, email, and/or facsimile) to corresponding subsets of users. Each server 119 may also provide other services including, for example, user account management and configuration, billing services, accounting services, etc. Each pod unit includes an account database 121 to support the communication server(s) for that particular pod unit, storing configuration details and other information regarding each user's account.

In some embodiments, devices 243A-243F can receive messages from the data centers or access stored messages at the data centers. In some embodiments, devices 243A-243F may receive notification of new messages from communication servers 119 and then access the stored messages at the data center. In some embodiments, devices 243A-243F may be configured to generate and provide notifications of messages to the users upon receipt of new messages.

Pod units 1A and 1B are in communication with one another so that the data on their respective account databases are synchronized across data centers. Data center 101 includes router 213A to receive an incoming service request 231A from network 217. Router 213A parses the incoming service request to identify or extract a user key and queries GUD 215A to determine which pod is associated with the user key. Once the associated pod has been identified router 213A routes the service request to the pod unit in the data center associated with the identified pod. If the pod unit associated with the identified pod is not associated with data center 101, router 213A may route the service request to another data center (e.g., data center 102 as indicated by the arrow 241A).

Each pod unit of the data center 101 is also coupled to MSS 211A which stores files for the users served by pod units 1A and 2A. These files may include, for example, messages (e.g., voicemails and facsimiles), user logs, system messages, system and user call prompts (e.g., auto-attendant or user-recorded greetings), and other types of call-related or electronic messages. The contents of MSS 211A are synchronized with other data centers (e.g., synchronized with MSS 211B of data center 102).

Each pod unit in data center 101 is coupled to common database 207A which stores shared data for all of the pods, and stores consolidated information from account databases 121. Common database 207A also facilitates changes to the pod databases. For example, common database 207A may store data for applications that provide the services on communication servers 119. Different versions of the applications data may be stored in common database 207A which allow changes and upgrades to communication servers 119 to be implemented efficiently and conveniently. Changes may be made to common database 207A and propagated to pod units 1A and 2A. Common database 207A is synchronized across data centers to other common databases (e.g., common database 207B of data center 102). Common database 207A, MSS 211A, router 213A, and GUD 215A form a common layer of resources that are shared by all pod units in data center 101.

Figure 3:
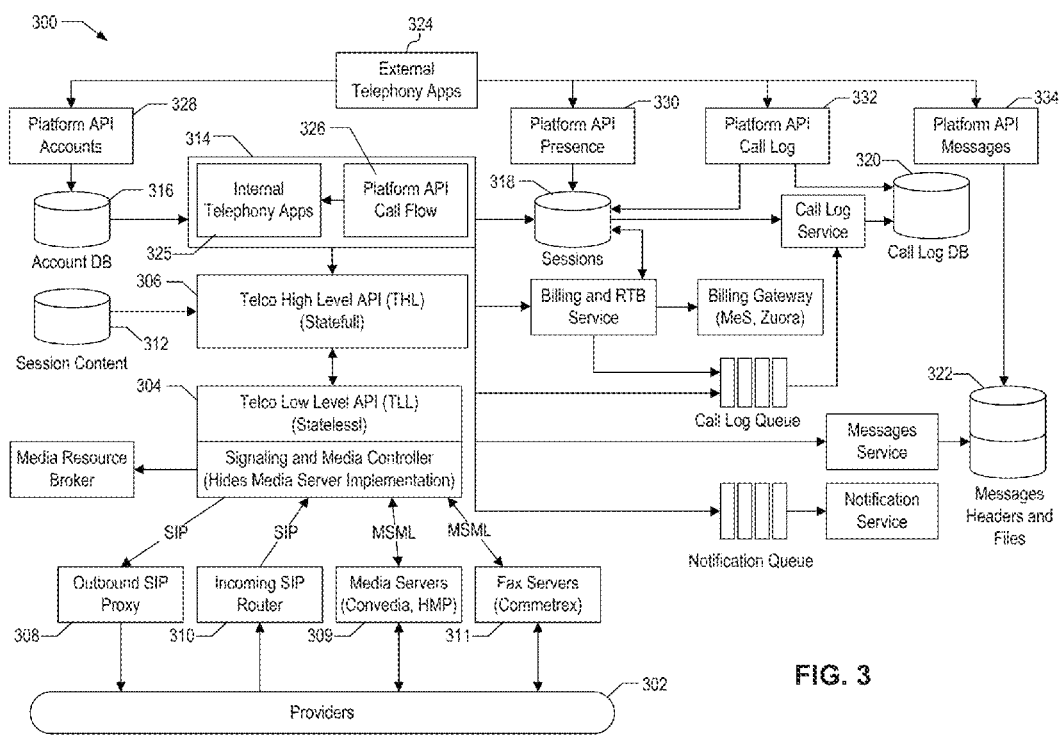
FIG. 3 is a simplified block diagram of an example of a telephony services platform employing techniques as described herein.

FIG. 3 is a simplified block diagram of an example of a PBX platform (e.g., communication system 100 of FIGS. 1 and 2) that can be used to implement various embodiments described herein. PBX platform 300 provides telephony services that allow communication among its users, and between its users and users associated with a variety of external telephony platforms 302 via telecommunication APIs 304 and 306, Outbound SIP Proxy 308, and Incoming SIP Router 310. Media Servers 309 and Fax Servers 311 provide functionality for processing voice over IP and fax over IP data, respectively. Telco API 304 is a stateless low-level API that provides signaling and media telephony primitives including, for example, call answering, placing of outbound calls, creation of conference call objects, addition of calls to conference call objects, playback of media for active calls, recording of active calls, etc. Telco API 306 is a higher-level API that has more sophisticated functionality such as, for example, interactive voice response (IVR), call forwarding, voice mail, etc. In the depicted implementation, telco API 306 doesn't have access to the PBX platforms databases, but maintains session context data 312 to support its functionality. Telco API 306 may include function primitives which can be used to support the development of telephony applications.

Outbound SIP Proxy 308, and Incoming SIP Router 310 employ the Session Initiation Protocol (SIP), an IETF-defined signaling protocol widely used for controlling communication sessions such as voice and video calls over the Internet Protocol (IP). SIP can be used for creating, modifying and terminating two-party (unicast) or multiparty (multicast) sessions, and may be one of the core protocols employed by systems configured as shown in and described above with reference to FIGS. 1 and 2.

The core functionality of PBX platform 300 (e.g., as described above with reference to FIGS. 1 and 2) is accessed via telephony services block 314 which has access (not entirely shown for clarity) to the various data repositories of PBX platform 300, e.g., account DB 316, sessions DB 318, call log DB, 320 and message DB 322. Telephony services block 314 receives commands from telephony applications 324 and controls execution of the commands on the PBX platform 300. Telephony services block 314 may also include internal telephony applications 325 that are hosted and/or developed on or in connection with PBX platform 300. The depicted implementation also includes various APIs that allow external telephony applications 324 to interact with PBX platform 300. The APIs associated with PBX platform 300 allow telephony applications 324 and 325 to integrate with basic functionality of PBX platform 300 at multiple integration points, to control call flows during execution of the call flows by the platform (e.g., via API 326), and to access platform data (e.g., in DBs 316-322 via APIs 328-334).

In some embodiments, a notification generation unit may be implemented in association with a telephony system to identify certain attributes of the received messages and to determine features of the notifications based on the identified attributes of the received messages. In the present disclosure, a message may be a voicemail message, an email, a text message, a fax, a multimedia data file, and/or any other types of messages that are used to convey information. The notification generation unit may be implemented using one or more computing devices (e.g., servers) and associated data stores, and may be part of the notification service or implemented separately.

Figure 4:
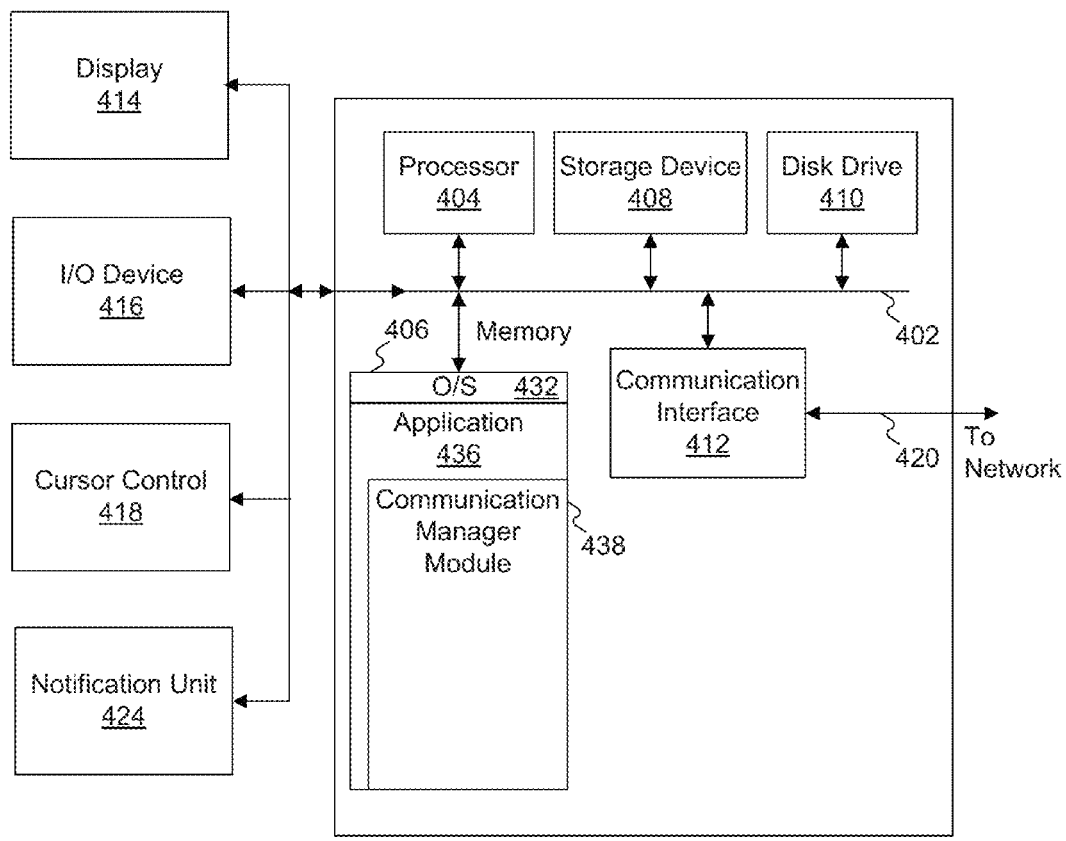
FIG. 4 illustrates an example device for implementing embodiments consistent with the present disclosure.

FIG. 4 illustrates an example device for implementing embodiments consistent with the present disclosure. In some examples, the device 400 can be used to implement computer programs, applications, methods, processes, or other software to perform embodiments described in the present disclosure, such as communication servers 119 and devices 243A-243F provided in FIG. 2. Device 400 includes a bus 402 or other communication mechanism for communicating information, which interconnects subsystems and devices. As shown in FIG. 4, device 400 may include one or more processors 404, system memory ("memory") 406, storage device 408 (e.g., ROM), disk drive 410 (e.g., magnetic or optical), communication interface 412 (e.g., a modem, Ethernet card, or any other interface configured to exchange data with a communications network), display 414 (e.g., CRT or LCD), input/output device 416 (e.g., keyboard or touch screen), cursor control 418 (e.g., mouse or trackball), and/or notification device 424.

According to some examples, device 400 performs specific operations in which processor 404 executes one or more sequences of one or more instructions stored in system memory 406. Such instructions can be read into system memory 406 from another computer readable medium, such as static storage device 408 such as a disk drive. In some examples, hard-wired circuitry can be used in place of or in combination with software instructions for implementation. In the example shown, system memory 406 includes modules of executable instructions for implementing an operation system ("O/S") 432, an application 436, and a communication manager module 438, which can provide the functionalities disclosed herein.

Device 400 transmits and receives messages, data, and instructions, including program code (i.e., application code) through communication link 420 and communication interface 412. Received program code is executed by processor 404, and stored in disk drive 410, or other non-volatile storage for later execution.

In some embodiments, device 400 includes a notification unit 424. The notification unit 424 can comprise one or more of a vibration device, a vibratory motor, a haptic display, a sound generation device, etc. The notification unit 424 is configured to identify attributes of received messages, and determine notification feature, such as duration of the notification, level of the notification (e.g., volume of the ringtone, vibration level, etc.), tone of the ringtone, for the notifications of the messages presented to the user via a display interface, an audio interface, a vibration device, and/or the like. The notification unit 424 controls device 400 such that the notification is provided according to the notification features, such as having a specific duration, frequency, etc. For example, notification unit 424 may be configured to identify a dimension of received message (e.g., a time length of the message, a number of characters contained in the message, a disk space occupied by the message, etc.), and determine duration of notification, e.g., duration of an alerting tone or vibration, based on the dimension of received message. For another example, notification unit 424 may be configured to identify a dimension of received message and determine power or frequency of the notification message, e.g., volume of an alerting tone or vibration patterns, based on the dimension of received message. In some embodiments, notification unit 424 may be configured to identify a degree of importance of the received message and determine the notification features based on the importance level.

Figure 5:
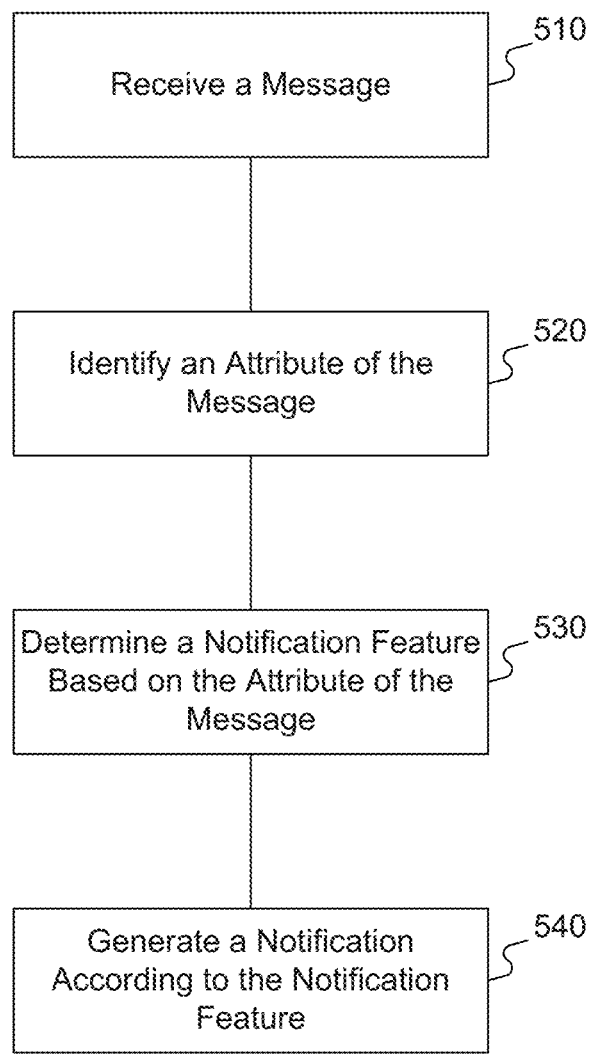
FIG. 5 illustrates an example process for providing a notification of messages, in accordance with embodiments of the present disclosure.

FIG. 5 depicts an example process 300 for providing notification of messages to users, in accordance with some embodiments of the present disclosure. The steps associated with this example process can be performed by the components of FIG. 1 or FIG. 2. In the following description, reference is made to certain components of FIG. 2 for purposes of illustration. It will be appreciated, however, that other implementations are possible and that components other than that illustrated in FIG. 2 can be utilized to implement the example method of FIG. 2.

In step 510, a device (e.g., devices 243A-243F) receives a message from a server (e.g., communication servers 119) via a network (e.g., a cellular network or Internet). The message may be originated from another user device, and the message may be routed to the receiving device through the server. The received message may be a voicemail message, a video message, an email, a text message, a fax, a multimedia data file, and/or any other types of messages that convey information. In some embodiments, the received message may be a digital message file, such as an audio or video file that may be presented to the user using an appropriate application. The digital message file may have associated metadata describing the message file, such as a dimension of the message (e.g., time length of the message, number of pages of the message), identifier for the sending user device (e.g., sender name and/or phone number), a user identifier for the intended recipient (e.g., user name and/or phone number), the message type, the date and time the message was received, etc.

The device determines an attribute associated with the received message, such as a dimension of the received message, at step 520. The device may determine the attribute associated with the received message based on contents of the message. The attribute of the message may be a digital file size of the message, a time length of the message, a content length of the message, etc., depending on the type of message received. For example, if the received message is a voicemail message, the device may identify a time length of the message as the dimension of the message. In another example, if the received message is a short message system (SMS) text message, the device may identify the number of characters contained in the message. If the message is a digital message file, the device may identify the amount of disk space in kilobytes occupied by the message. In some implementations, when metadata associated with a message file is received, the device may identify the attribute of the message by retrieving the information in the metadata. In some implementations, the device may use appropriate applications based on the type of the received message to obtain the information of the attribute of the message. It should be understood that the attribute described in the present disclosure is not limited to a particular parameter of the message, and it may be any parameter associated with the content of the message.

At step 530, the device determines a notification feature based on the attribute of the message. The notification feature may be a duration of the notification, a power of the notification, a frequency of the notification, a vibration pattern of the notification, a color of a flashing light, a pulsating effect of the icon associated with messages, or any other feature s that are associated with the notifications to be provided to a user for indication of the receipt of a new message. In some embodiments, the device may determine a duration of the notification based on the attribute of the message, such as, a dimension of the message. For example, if a voicemail message is received and the time length of the voicemail message is less than a second, a notification of a very short duration, such as a short beep or a short ring, may be generated to alert the user that the voicemail message is very small in content. On the other hand, if a voicemail message is received and the time length of the voicemail is longer than a certain period, e.g., one minute, a notification of a relatively long duration, such as a long beep or a long ring, may be generated to alert the user that the voicemail message contains some content and may be of importance to the user. In some instances, the duration of the notification may be conversely correlated with the dimension of the message. For example, a long notification may be generated in response to a short SMS message indicating a particular event, such as an activation of a smoke detector.

In some embodiments, the level of the notification, such as a volume of a ring tone or a vibration level may be determined based on the attribute of the message so as to notify to the user the attribute of the message. For example, when the dimension of the received message is small, a low volume of the ring tone may be generated, while a high volume of the ring tone may be generated when the dimension of the message is large. The device may also determine the frequency of the notification based on the dimension of the message. For example, a ring tone may be generated for a single time to alert the receipt of the new message when the dimension of the message is small. On the other hand, when the dimension of the message is large, the ring tone may be periodically generated to bring the message to the user's attention until the message is reviewed by the user. It should be understood that the notification feature may be other features associated with the notification to indicate aspects of the new message without departing the spirit of the present disclosure.

In some embodiments, the notification feature may be determined among a plurality of pre-determined levels. For example, the volume of the ring tone notification may be pre-set as low, medium, or high. The device may determine the volume of the ring tone notification to be low, medium, or high, based on the dimension of the message, when a new message is received. For another example, the duration of the ring tone notification may be pre-set as 1 second, 5 seconds, and 10 seconds. The device may determine the duration of the notification as one of the pre-determined durations, based on the attribute of the message, when a new message is received. The number of notification levels and each of the pre-determined notification levels may be set by the user through a user interface.

In some embodiments, the device may determine the notification feature according to a pre-determined rule, based on the attribute of the message. The pre-determined rule may define a relationship between the attribute of the message and the notification feature. For example, the pre-determined rule may define that for voicemail messages with a time length less than ten seconds, a low volume ring tone notification may be generated. The pre-determined rule may further define that for voicemail messages with a time length more than two minutes, a high volume ring tone notification may be generated, and for voicemail messages with a time length between ten seconds and two minutes, a medium volume ring tone notification may be generated.

The pre-determined rule may also take into account other attributes of the message. In some embodiments, the pre-determined rule may consider certain words occurring in the voicemail message. For instance, if a high priority word, such as fire alarm, is detected in the voicemail message, a high volume ring tone notification may be generated even if the time length of the voicemail message is less than a predetermined threshold, e.g., ten seconds in the example above. For another instance, if a low priority word, such as advertisement, is detected in the voicemail message, a low volume ring tone notification may be generated even if the time length of the voicemail message is longer than a predetermined threshold, e.g., two minutes in the example above. For another instance, if the caller's phone number is not included in the contact list of the user, a low volume ring tone notification may be generated even if the time length of the voicemail message is longer than the predetermined threshold, e.g., two minutes in the example above. The pre-determined rule, as well as other message attributes used in the pre-determined rule, may be set by the user through a user interface. It should be understood that the pre-determined rule may be any rule defining a relationship between a notification feature and an attribute of the message without departing the spirit of the present disclosure.

In some embodiments, the pre-determined rule may also include user defined rules. For example, the device may determine the notification features taking into account user defined rules, such as importance level associated with a particular sender, in combination with a dimension of the message.

At step 540, the device generates a notification according to the notification feature. For example, if the notification feature is a certain period of duration, the device may provide the notification, such as a ringtone or vibration, with the determined duration. If the notification feature is a notification level, the device may provide the notification, such as a ringtone or vibration, according to the determined level. By providing the notification according to the notification feature, the notification indicates to the user attributes of the new message, e.g., dimension of the message, in addition to the receipt of the new message. Thus, the notification allows the user to decide whether and when to read the new message based on information regarding certain attributes of the message conveyed in the notification.

In the above discussion of process 300, the user device is referred to as the entity performing the steps in the process. According to certain embodiments, the steps described in process 500 may also be performed by a server associated with a communication service provider, such as communication servers 119. In some implementations, a new message may be stored at the server for later retrieval by the user, and the message itself is not sent to the user device. In these scenarios, as the message is not available at the user device, the server may identify the attribute of the message, determine the notification feature, and send the notification and the notification attribute to the user device via the network. The user device may in turn provide the notification to the user according to the notification feature. For example, the server may send a notification along with a notification feature such as a duration of the notification, to the user device indicating a new voicemail message is received. The user device may then provide a notification to the user, such as a ring tone notification, with the duration of the notification that is received from the server. In this example, the determination of attributes of the new message and determination of notification feature is performed by the server, and the user device generates the notification according to the notification feature received from the server.

In other embodiments, the server may identify determinations of the new message, determine the notification feature, and send the notification feature to the user device along with the new message. The user device may store the message and provide the notification to the user according to the received notification feature. This can be useful when the user device does not have the capability to identify attributes of the new message or determine the notification feature. Moreover, this allows the server to take into account other information available at the network to determine the notification feature. For example, the server may determine the notification feature based on the attribute of the message and the communication history between the sending user and the receiving user over a certain period of time.

Figure 6:
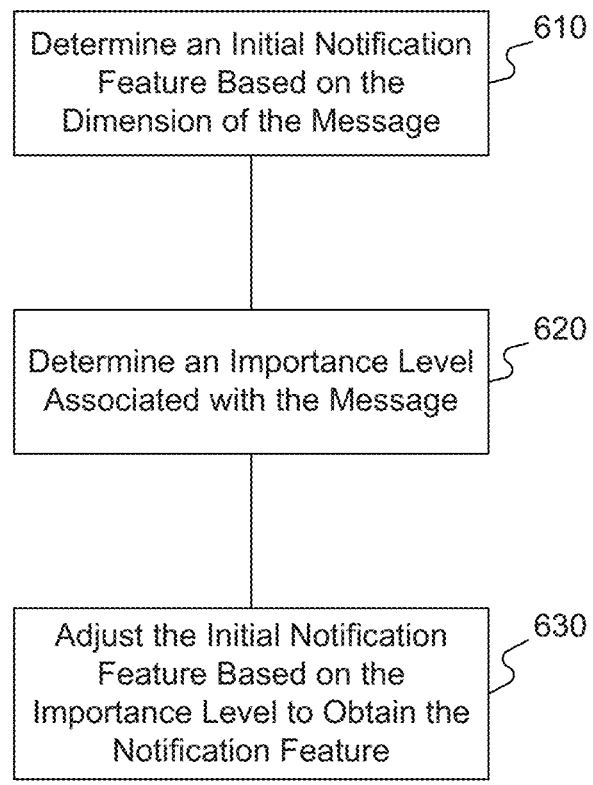
FIG. 6 illustrates an example process for determining a notification feature, in accordance with embodiments of the present disclosure.

FIG. 6 illustrates an example process 600 for determining a notification feature. In the example process 600, the notification feature is determined based on the attribute of the message and an importance level of the message. The importance level of the message may be identified based on content of the message, sender of the message, communication history with the sender, or the like. The steps associated with this example process 600 can be performed by the components of FIG. 1 or FIG. 2, such as devices 243A-243F and communication servers 119.

At step 610, the device may determine an initial notification feature based on the attribute of the message. For example, the initial notification feature may be a duration of the notification, a level of the notification, a frequency of the notification, a vibration pattern of the notification, a color of a flashing light, or any other features that are associated with the notifications. The initial notification feature reflects the attribute of the message and provides an initial value of the notification feature.

At step 620, the device determines an importance level associated with the new message. In some embodiments, the importance level may be determined based on content of the message. For example, the device may identify that a voicemail message or a subject line of an email contains the word "litigation" or "settlement," and determine that the message is of high importance. Conversely, the device may identify that a voicemail message or a subject line of an email contains the word "broadcast" or "news," and determine that the message is of low importance. For another example, the user may select a group of high importance or low importance words. If the device detects that any word of the high importance group of is included in a message, the message may be of high importance. Conversely, if the device detects that any word of the low importance group is included in a message, the message may be of low importance.

In some embodiments, the importance level may be determined based on context of the message, such as sender of the message, prior correspondences with the sender, etc. For example, the device may determine the importance level based on a frequency of communication between the users during a pre-determined time period. For instance, if there have been a high number of phone calls or email correspondences between the sending user and the receiving user during the past week, the device may determine that the message is of high importance. Similarly, if the sending user has sent a large number of messages that have been unanswered by the receiving user, the device may determine that the message is of high importance. On the other hand, if the receiving user has never initiated a communication with the sending user during the past month, the device may determine that the message is of low importance.

In some embodiments, the importance level may be determined based on sender of the message. For example, the device may identify that the sending user is included in the contact list of the receiving user and determine that the message is of high importance. If the device identifies that the sending user is not included in the contact list of the receiving user, the device may determine that the message is of low importance. For another example, the user may select a contact group of high importance or low importance. If the device detects that the sending user of the message is included in the contact group of high importance, the message may be determined to have high importance. Conversely, if the device detects that the sending user of the message is included in the contact group of low importance, the message may be determined to have low importance.

At step 630, the device may adjust the initial notification feature based on the importance level to obtain the notification feature. The initial notification feature may be increased or decreased based on the importance level. For example, the device may determine the initial notification feature to be a short duration of notification in step 610 as the dimension of the message is small. If the identified importance level of the message is high, the device may increase the notification feature such that the duration of notification is a long duration. On the other hand, if the importance level is low, the device may maintain the initial notification feature as a short duration of notification. For another example, the device may determine the initial notification feature to be a long duration of notification in step 610 as the dimension of the message is large. If the identified importance level of the message is high, the device may maintain the initial notification feature as a long duration of notification. On the other hand, if the importance level is low, the device may decrease the notification feature such that the duration of notification becomes a short duration.

In some implementations, the device may determine whether to adjust the initial notification feature based on both the value of the initial notification feature and the importance level. For example, if the initial notification feature is as a long duration of notification, the device may not further increase the initial notification feature even when the identified importance level of the message is high. If the initial notification feature is as a short duration of notification, the device may not decrease the initial notification feature even when the identified importance level of the message is low.

In some implementations, the user may control the user device through a user interface to enable or disable the function of adjusting the notification feature based on an identified importance level. For example, the example process 600 may be disabled such that the notification feature is based on the attribute associated with the message, such as a dimension of the message, and is not adjusted by the identified importance level. On the other hand, if a user desires to adjust the notification feature based on the identified importance level, the user may control the user device through a user interface to enable this function.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, advantageous results still could be achieved if steps of the disclosed techniques were performed in a different order or if components in the disclosed systems were combined in a different manner or replaced or supplemented by other components. Other implementations are also within the scope of the following example claims.

Therefore, it is intended that the disclosed embodiments and examples be considered as examples only, with a true scope of the present disclosure being indicated by the following claims and their equivalents.

What is claimed is:

1. A system for providing a notification feature to a user device, the system comprising:
   at least one network interface; and
   at least one processor in communication with the network interface and configured to:
   receive a message via the at least one network interface;
   determine the notification feature based, at least in part, on a content length of the message in combination with a pre-determined rule associated with an importance level; and
   send the notification feature to the user device.

2. The system of claim 1, wherein the notification feature includes a notification duration associated with the message.

3. The system of claim 1, wherein the attribute is a dimension of the message.

4. The system of claim 3, wherein the message is a voicemail message, and the dimension of the message is a time length of the voicemail message.

5. The system of claim 1, wherein the user device is configured to present a notification according to the notification feature.

6. The system of claim 1, wherein the at least one processor is further configured to:
   determine an importance level associated with the message; and
   adjust the notification feature based on the importance level.

7. The system of claim 6, wherein the importance level is determined based on a frequency of communication with a sender of the message during a pre-determined time period.

8. The system of claim 1, wherein the at least one processor is further configured to receive a user input setting a pre-determined rule, the pre-determined rule determining a relationship between the content length of the message and the notification feature, and the notification feature is determined based on the pre-determined rule.

9. A system for providing a notification feature to a user device, the system comprising:
   at least one network interface; and
   at least one processor in communication with the network interface and configured to:
   receive a voicemail message via the at least one network interface;
   determine the notification feature based, at least in part, on the length of the voicemail message in combination with a pre-determined rule associated with an importance level; and
   send the notification feature to the user device.

* * * * *